(12) United States Patent
Kamiya et al.

(10) Patent No.: US 10,654,202 B2
(45) Date of Patent: May 19, 2020

(54) RESIN MOLDING AND METHOD FOR PRODUCING THE SAME

(71) Applicant: TOYOTA BOSHOKU KABUSHIKI KAISHA, Aichi-ken (JP)

(72) Inventors: Hideo Kamiya, Aichi-ken (JP); Masanori Hashiba, Gifu-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/949,725

(22) Filed: Apr. 10, 2018

(65) Prior Publication Data

US 2018/0297250 A1  Oct. 18, 2018

(30) Foreign Application Priority Data

Apr. 14, 2017  (JP) .................................. 2017-080754

(51) Int. Cl.
*B29C 45/14* (2006.01)
*B29C 43/02* (2006.01)
(Continued)

(52) U.S. Cl.
CPC .............. *B29C 45/14* (2013.01); *B29C 43/02* (2013.01); *B29C 45/14262* (2013.01);
(Continued)

(58) Field of Classification Search
CPC .............. B29C 45/14; B29C 45/14336; B29C 45/14262; B29C 45/14786; B29C 43/02;
(Continued)

(56) References Cited

U.S. PATENT DOCUMENTS

2003/0076662 A1   4/2003 Miehling
2003/0175467 A1*  9/2003 Campbell ......... B29C 66/12841
                                                      428/61
(Continued)

FOREIGN PATENT DOCUMENTS

CN    103826822 A    5/2014
CN    103987508 A    8/2014
(Continued)

OTHER PUBLICATIONS

U.S. Appl. No. 15/950,873, filed Apr. 11, 2018, Kamiya, US 2018/0297255 A1.
(Continued)

*Primary Examiner* — David Sample
*Assistant Examiner* — Donald M Flores, Jr.
(74) *Attorney, Agent, or Firm* — Greenblum & Bernstein, P.L.C.

(57) ABSTRACT

Provided is a resin molding in which two types of substrates have a connection part constituted of a thin part provided from the one substrate to the other substrate with a boundary defined by end surfaces of the respective substrates, wherein the density of the one substrate in the connection part is higher than the density of a base part excluding the connection part. The resin molding can have a configuration in which the one substrate is a plate-like substrate including reinforcing fibers and a first thermoplastic resin binding the reinforcing fibers to each other and the other substrate is an injection-molded member connected along the plate face direction of the one substrate from an end surface of the one substrate. Moreover, it is preferred that the connection part have, on the side thereof closer to the other substrate, a section gradually thinned from a position at which the connection part extends and the connection interface be located at an intermediate part of the part that is gradually
(Continued)

thinned. It is preferred that the reinforcing fibers be plant fibers, such as kenaf.

9 Claims, 4 Drawing Sheets

(51) Int. Cl.
| | |
|---|---|
| B29K 101/12 | (2006.01) |
| B29L 31/30 | (2006.01) |
| B60R 13/02 | (2006.01) |
| B29K 201/00 | (2006.01) |
| B29K 311/10 | (2006.01) |

(52) U.S. Cl.
CPC .. B29C 45/14336 (2013.01); B29C 45/14786 (2013.01); *B29C 2045/14098* (2013.01); *B29K 2101/12* (2013.01); *B29K 2201/00* (2013.01); *B29K 2311/10* (2013.01); *B29L 2031/3041* (2013.01); *B60R 13/02* (2013.01); *B60R 13/0212* (2013.01); *B60R 13/0243* (2013.01); *B60Y 2410/122* (2013.01); *Y10T 428/19* (2015.01); *Y10T 428/192* (2015.01); *Y10T 428/24479* (2015.01); *Y10T 428/24992* (2015.01)

(58) Field of Classification Search
CPC ......... B29C 2045/14098; Y10T 428/19; Y10T 428/24992; Y10T 428/192; Y10T 428/24479; B60R 13/02; B60R 13/0212; B60R 13/0243; B29K 2311/10; B29K 2101/12; B29K 2201/00; B29L 2031/3041; B60Y 2410/122
See application file for complete search history.

(56) References Cited

U.S. PATENT DOCUMENTS

| | | | |
|---|---|---|---|
| 2004/0209032 A1* | 10/2004 | Wani | B29C 45/0046 428/57 |
| 2007/0190203 A1 | 8/2007 | Kim et al. | |
| 2013/0255103 A1* | 10/2013 | Dua | A43B 1/04 36/87 |
| 2014/0234631 A1 | 8/2014 | Iino et al. | |
| 2014/0302284 A1 | 10/2014 | Hashiba et al. | |
| 2016/0052203 A1* | 2/2016 | Fujii | B29C 65/02 156/180 |
| 2017/0042264 A1 | 2/2017 | Dua et al. | |
| 2018/0297251 A1* | 10/2018 | Maruyama | B29C 45/14 |
| 2018/0297255 A1* | 10/2018 | Kamiya | B29C 45/14508 |

FOREIGN PATENT DOCUMENTS

| | | |
|---|---|---|
| CN | 104334043 A | 2/2015 |
| DE | 202007001776 | 7/2008 |
| DE | 102015209789 | 12/2016 |
| JP | 2001-315161 | 11/2001 |
| JP | 4674256 | 4/2011 |

OTHER PUBLICATIONS

U.S. Appl. No. 15/948,803, filed Apr. 10, 2018, Maruyama et al., US 2018/0297251 A1.

Office Action dated Dec. 27, 2019 of the corresponding Chinese Application (No. 201810331490.1) along with the English machine translation.

* cited by examiner

RESIN MOLDING AND METHOD FOR PRODUCING THE SAME

CROSS-REFERENCE TO RELATED APPLICATIONS

The present application claims priority under 35 U.S.C. § 119 of Japanese Application No. 2017-80754 filed on Apr. 14, 2017, the disclosure of which is expressly incorporated by reference herein in its entirety.

BACKGROUND

1. Technical Field

The present invention relates to a resin molding and a method for producing the same. Particularly, the present invention relates to a resin molding having a connection part constituted of a thin part provided near connected end surfaces of two types of substrates over the respective sides of the two types of substrates, wherein the density of one substrate at the connection part is higher than the density of a base part, and a method for producing the same.

2. Related Art

There is known a molding method wherein, when obtaining a resin molding of a soft member by insert-molding, a difference in level is provided at a welded part of a soft member part and a molded resin part in the plane direction of both the parts and the pressure of the resin to be injected is prevented from being applied strongly in the plane direction of the soft member inserted (see, for example, JP-A-2001-315161), and it is described that distortion of the soft member part of the resin molding is thereby prevented.

When the resin molding is a vehicle interior material, an under shape structure for attaching the internal material to a vehicle panel, such as a retainer bracket, a boss, or a runner, is attached to the substrate on the rear surface thereof, which is to be located opposite from the compartment. Such an under shape structure has been provided by injection-molding a thermoplastic resin to the rear surface of the substrate simultaneously with press-molding of the substrate. In a vehicle interior material, such as a door trim or a roof trim, an aesthetic under shape part has been provided at a peripheral part of the plate-like substrate, and the aesthetic under shape part can be formed by injecting resin against an end surface of the plate-like substrate.

SUMMARY

As described above, there has been known a technology of providing a difference in level in a welded part so that the pressure of the resin to be injected is prevented from being applied strongly in the plane direction of the soft member part inserted.

Although described in an application filed on the same day by the same applicant of this invention it is known, regarding the substrates of the above-mentioned vehicle interior materials, etc., that various types of structure or the like is formed by injecting resin to a rear surface and an edge part of a substrate, a difference in level may be produced near a joined part due to the difference in thermal shrinkage and the resin may be made to leak out to the side of the substrate by the injection pressure of the resin (see the difference in level denoted by symbol d in FIGS. 1 and 6, and the leaked resin denoted by symbol m). Moreover, it is also possible that the resin injected pushes the substrate on its joined interface, forming wrinkles on the substrate (see the region where wrinkles denoted by symbol s in FIGS. 2(*b*) and 7 were formed; p in FIG. 2(*b*) denotes injection pressure).

If a difference in level, a resin leakage, or wrinkles are produced near the joined part as described above, this may entail deterioration of the aesthetic nature even if a skin material is stacked to the resin molding on its side that will become an aesthetic surface when being used as an interior material for vehicles, such as a door trim or a roof trim. Therefore, it is necessary to solve or alleviate the above-described problems caused by the difference in thermal shrinkage between a substrate and a resin to be injected and the pressure of a resin to be injected by some means and afford a resin molding capable of serving as an interior material with good aesthetic nature, etc.

The present invention has been devised in light of the above-described state of the conventional technologies and the above-described problem such as difference in level on the aesthetic surface side, a resin leakage, or wrinkles produced near the joined part of resin molding, and one object thereof is to provide a resin molding having a connection part constituted of a thin part provided near connected end surfaces of two types of substrates over from one substrate to the other substrate, wherein difference in level on the aesthetic surface side in connection part is suppressed by making the density of the one substrate at the connection part is higher than the density of a base part, and a method for producing the same.

Another object is to provide a resin molding in which one substrate is a plate-like substrate including reinforcing fibers and a first thermoplastic resin and the other substrate is an injection-molded member connected to the one substrate, wherein the density of the one substrate in the connection part is made higher than the density of a base part by reduction in thickness in the connection part and difference in level on the aesthetic surface side in connection part is suppressed, and a method for producing the same.

The present invention is directed to a resin molding in which two types of substrates are connected to each other on the end surfaces thereof, wherein the resin molding has a connection part constituted of a thin part provided from the one substrate to the other substrate with a boundary defined by the end surfaces, and wherein the density of the one substrate in the connection part is higher than the density of a base part excluding the connection part. Further aspects of the invention, which correspond to various depending claims of the invention, include the following.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate.

The connection part has, on the side thereof closer to the other substrate, a section gradually thinned from a position at which the connection part extends.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, and wherein the connection part has, on the side thereof closer to the other substrate, a section gradually thinned from a position at which the connection part extends.

The connection part has, on the side thereof closer to the other substrate, a section gradually thinned from a position at which the connection part extends, and the end surfaces are located at an edge part of the part that is gradually thinned.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, and the end surfaces are located at an edge part of the part that is gradually thinned.

The connection part has, on the side thereof closer to the one substrate, a section gradually thinned from a position at which the connection part extends.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate,and wherein the connection part has, on the side thereof closer to the one substrate, a section gradually thinned from a position at which the connection part extends.

The connection part has, on the side thereof closer to the other substrate, a section gradually thinned from a position at which the connection part extends, and wherein the connection part has, on the side thereof closer to the one substrate, a section gradually thinned from a position at which the connection part extends.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, and wherein the connection part has, on the side thereof closer to the one substrate, a section gradually thinned from a position at which the connection part extends.

The connection part has, on the side thereof closer to the other substrate, a section gradually thinned from a position at which the connection part extends, the end surfaces are located at an intermediate part of the part that is gradually thinned, and wherein the connection part has, on the side thereof closer to the one substrate, a section gradually thinned from a position at which the connection part extends.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, the end surfaces are located at an edge part of the part that is gradually thinned, and wherein the connection part has, on the side thereof closer to the one substrate, a section gradually thinned from a position at which the connection part extends.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, and wherein the reinforcing fibers are plant fibers.

The connection part has, on the side thereof closer to the other substrate, a section gradually thinned from a position at which the connection part extends, and wherein the reinforcing fibers are plant fibers.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, and wherein the reinforcing fibers are plant fibers.

The connection part has, on the side thereof closer to the other substrate, a section gradually thinned from a position at which the connection part extends, wherein the end surfaces are located at an edge part of the part that is gradually thinned, and wherein the reinforcing fibers are plant fibers.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, wherein the end surfaces are located at an edge part of the part that is gradually thinned, and wherein the reinforcing fibers are plant fibers.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the one substrate, a section gradually thinned from a position at which the connection part extends, and wherein the reinforcing fibers are plant fibers.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, wherein the connection part has, on the side thereof closer to the one substrate, a section gradually thinned from a position at which the connection part extends, and wherein the reinforcing fibers are plant fibers.

The one substrate is a plate-like substrate comprising reinforcing fibers and a first thermoplastic resin binding the reinforcing fibers to each other, and the other substrate is an injection-molded member connected along the plate face direction of the one substrate from an end surface of the one substrate, wherein the connection part has, on the side thereof closer to the other substrate, a section gradually thinned from a position at which the connection part extends, wherein the end surfaces are located at an edge part of the part that is gradually thinned, wherein the connection part has, on the side thereof closer to the one substrate, a section gradually thinned from a position at which the connection part extends, and wherein the reinforcing fibers are plant fibers.

The first thermoplastic resin and the second thermoplastic resin contained in the other substrate are the same type of thermoplastic resin.

The invention is also directed to a method comprising shaping the one substrate; and injection molding a thermoplastic resin composition against the end surface of the one substrate shaped, thereby connecting the other substrate, wherein in the injection-molding, there is arranged a mold for forming the connection part at a region that is to become the connection part.

The resin molding of the present invention has a connection part constituted of a thin part provided from one substrate to the other substrate near connected end surfaces of the two types of substrates, wherein the density in the connection part of one substrate is higher than the density of a base part of the substrate. Because of such a configuration, it is possible to suppress a difference in level near the joined part of the one substrate and the other substrate, leakage of the resin for constituting the other substrate toward the one substrate, and the occurrence of wrinkles near the joined part of the one substrate well as compared with a resin molding in which no connection part has been provided by thinning the vicinity of the connected end surfaces.

Moreover, when the one substrate is a plate-like substrate including reinforcing fibers and a first thermoplastic resin binding the reinforcing fibers to each other and the other substrate is an injection-molded member connected along the plate face direction of the one substrate, it is possible to easily make the density of a region of the connection part formed by thinning the one substrate higher than the density of a base part of the one substrate, and it is possible to sufficiently suppress the occurrence of a difference in level near the joined part, leakage of resin, and wrinkles of the one substrate.

Moreover, when the connection part has, on the side thereof closer to the other substrate, a region thinned gradually from the position from which the connection part extends, that part is joined to the end surface of the one substrate while the injection pressure of the resin is relaxed slowly, and therefore the occurrence of a difference in level, the leakage of the resin, and wrinkles of the one substrate near the joined part can be suppressed efficiently.

Moreover, when the connection part has, on the side thereof closer to the other substrate, a region gradually thinned from a position from which the connection part extends and the end surface (joined interface) is located at an edge part of the region which is thinned gradually, since joining to the end surface of the one substrate densified by thinning is advanced while the other substrate formed by injecting a resin is thinned, in other words, while the injection pressure is reduced, the difference in level, the leakage of the resin, and the generation of wrinkles of the one substrate near the joined part can be suppressed more sufficiently and efficiently.

Moreover, when the connection part has, on the side thereof closer to the one substrate, a region thinned gradually from a position from which the connection part extends, the one substrate is densified gradually from its base part, so that the occurrence of wrinkles due to the injection pressure applied from the other substrate can be suppressed efficiently.

The case where the reinforcing fibers are plant fibers is preferable in view of environmental clean-up, such as reduction in carbon dioxide emissions or fixing of carbon dioxide. Especially, plant resources that grow fast and absorb much carbon dioxide, such as kenaf, are useful for a resin molding made of a composite material with resin.

When the first thermoplastic resin and the second thermoplastic resin contained in the injection-molded member are the same type of thermoplastic resin, a resin molding in which one substrate and the other substrate are joined together firmly in one piece can be formed.

According to the method for producing a resin molding of the present invention, it is possible to easily produce a resin molding having a connection part having a prescribed shape and prescribed dimensions by shaping one substrate into a prescribed planar shape by press-molding or the like, and simultaneously connecting the other substrate at the connection part by injection-molding while arranging a mold for thinning a region that is to become the connection part.

DETAILED DESCRIPTION

Figure 1:
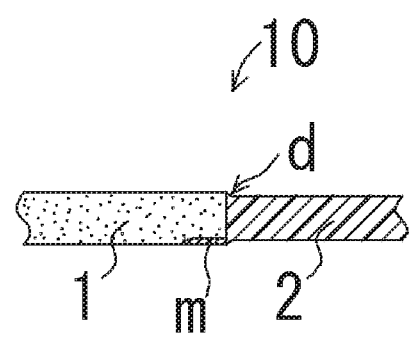
FIG. 1 is a schematic cross-sectional view of a resin molding in which a difference in level and resin leakage have occurred near the joined part of one substrate and the other substrate.

The present invention is hereafter described in detail with reference to drawings.

The particulars shown herein are by way of examples and for purposes of illustrative discussion of the embodiments of the present invention only and are presented for the purpose of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings, making apparent to those skilled in the art how some forms of the present invention may be embodied in practice.

[1] Resin Molding

In a resin molding 100 of the present invention (see FIGS. 3 to 5), two types of substrates (see the one substrate 1 and the other substrate 2 in FIGS. 3 to 5) are connected to each other on the end surfaces thereof; the resin molding has a connection part constituted of a thin part provided from the one substrate to the other substrate with a boundary defined by the end surfaces (see the connection part 31 in FIG. 3 and the connection part 32 in FIGS. 4 and 5), and wherein the density of the one substrate 1 in the connection part 31, 32 is higher than the density of a base part 11 excluding the connection part 31, 32.

Figure 2:
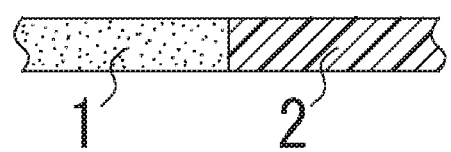
FIG. 2(a) is schematic cross-sectional view of a resin molding in which one substrate and the other substrate are joined on their respective end surfaces.
FIG. 2(b) is a schematic cross-sectional view of a resin molding in which the end surfaces have been shifted to the side of one substrate due to the injection pressure of the resin of the other substrate and wrinkles have been formed on the one substrate.
Figure 2:
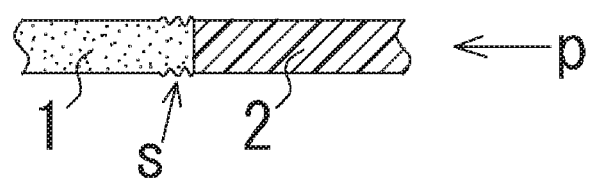

The difference in level in the vicinity of the connection part of the two types of substrates occurs, for example, when the materials that constitute the two types of substrate, respectively, differ in thermal shrinkage (see the difference in level d in FIG. 1). The resin leakage in the vicinity of the connection part of the two types of substrates is generated, for example, by leaking of a resin injected to the side of the one substrate 1 when the resin injected against an end surface of the one substrate 1 is joined and the other substrate 2 is thereby formed (see the resin leakage m in FIG. 1). Moreover, when a resin injected against an end surface of the one substrate 1 is joined and the other substrate 2 is thereby formed, the end surface of the one substrate 1 is pushed by the injection pressure near the joined part, so that wrinkles may be generated at the end part of the one substrate 1 [see the wrinkles s in FIG. 2(b)].

Figure 3:
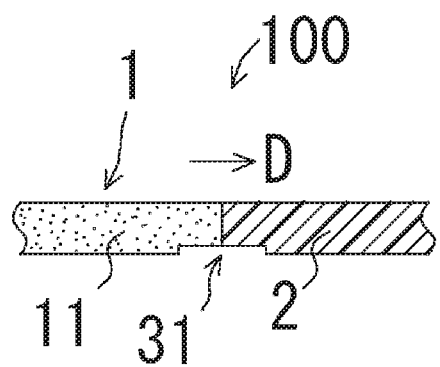
FIG. 3 is a schematic cross-sectional view of a resin molding in which a joined part constituted of a thin part with a rectangular cross-section has been formed near the joined part of one substrate and the other substrate.
Figure 4:
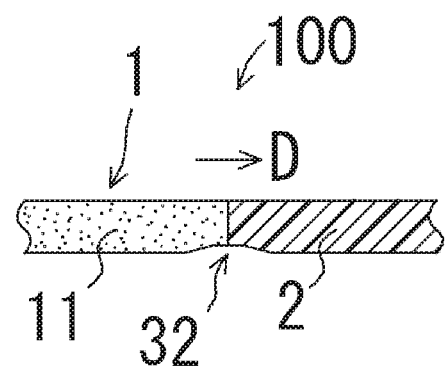
FIG. 4 is a schematic cross-sectional view of a resin molding in which a joined part constituted of a thin part with a trapezoidal cross-section having inclined surfaces on the sides of both substrates has been formed near the joined part of one substrate and the other substrate.
Figure 5:
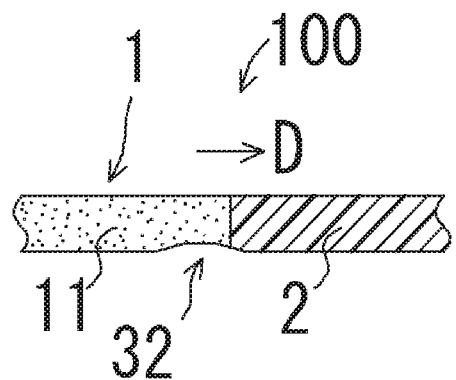
FIG. 5 is a schematic cross-sectional view of the resin molding in FIG. 4 in which the joined interface is located at an edge part of the inclined surface of the other substrate.

In order to prevent or suppress the generation of the difference in level, the resin leakage, or the wrinkles like those described above, the resin molding 100 of the present invention (see FIGS. 3 to 5) is provided with a connection part constituted of a thin part over from the one substrate 1 to the other substrate 2 with a boundary defined by the end surfaces of the two types of substrates (see the connection part 31 in FIG. 3 and the connection part 32 in FIGS. 4 and 5). Such a thin part can be formed by using a mold having a protruding part that corresponds to the shape of the thin part and arranging the mold in such a manner that the protruding part is in contact with a region that will become the thin part when molding the resin molding 100.

In the connection part 31, 32, the density in the connection part 31, 32 of the one substrate 1 of the two types of substrates is higher than the density of the base part 11 excluding the connection part 31, 32 (a region of the one substrate 1 in FIGS. 3 to 5 where the connection part 31, 32 is not formed). That is, the one substrate (the one substrate 1 in FIGS. 3 to 5) is made of a material that will have an increased density when its volume decreases with its thinning. For example, when the one substrate 1 is a porous material, the density thereof increases with decrease in its volume. On the other hand, as described above, the other substrate 2 or the like formed by injecting a resin usually keeps its density unchanged and almost constant even if its volume is reduced when being pushed.

The shape of the connection part 31, 32 is not particularly limited, and it may be rectangular (the connection part 31 in FIG. 3) or alternatively may be trapezoidal (the connection part 32 in FIGS. 4 and 5) when viewed on a cross-section in the interface of the one substrate 1 and the other substrate 2. Especially in the case of a connection part 32 whose cross-sectional shape is trapezoidal, the pushing force applied by a resin injected is reduced efficiently by gradually reducing the thickness from each of the one substrate 1 and the other substrate 2 toward the joined interface when, for example, the other substrate 2 is molded by injecting the resin against an end surface of the one substrate 1, and, as a result, resin leakage and generation of wrinkles are suppressed.

Moreover, the position of the joined interface of the one substrate 1 and the other substrate 2 on the transverse direction of the connection part 31 whose cross-sectional shape is rectangular is not particularly limited and it may be near the edge part or alternatively may be proximal to an end part, but it usually is near the intermediate part. When the cross-sectional shape of the connection part 32 is trapezoidal and, especially, when the other substrate 2 is molded by injecting a resin against the joined interface with the one substrate 1, the position of the interface is preferably near the intermediate part of an inclined surface of the other substrate 2 (the shaded portion of the other substrate 2 when viewed on a cross-section of the connection part 32) (see FIG. 5). Thanks to this, since the other substrate 2 formed by injecting the resin is thinned and simultaneously joined to an end surface of the one substrate 1 increased in density by thinning and the injection pressure is reduced gradually, the leakage of the resin, the generation of wrinkles in the one substrate 1, etc. are suppressed more efficiently.

The resin molding 100 of the present invention may have a configuration in which the one substrate 1 is a plate-like substrate including reinforcing fibers and a first thermoplastic resin binding the reinforcing fibers to each other and the other substrate 2 is an injection-molded member connected along the plate face direction of the one substrate 1, wherein the density in the connection part 31, 32 of the one substrate 1 is higher than the density of the base part 11 excluding the connection part 31, 32. In the resin molding 100, the other substrate 2 is extended along the plate face direction D of the one substrate 1 at least near the connection part 31, 32 of the other substrate 2 (see FIGS. 3 to 5 and 8).

The one substrate 1 is a plate-like body including reinforcing fibers and a first thermoplastic resin binding the reinforcing fibers to each other. The reinforcing fibers are not particularly limited and plant fibers, inorganic fibers, animal fibers, and the like can be used, and plant fibers are particularly preferred. Plant fibers are preferred from an environmental point of view, and they usually have a small specific gravity as compared to thermoplastic resin and can reduce the weight of resin moldings. Examples of the plant fibers include kenaf, hemp, cotton, palm fiber, and coconut fiber, and kenaf, which is a fast growing annual grass having a woody stem, is particularly preferred. Examples of the inorganic fibers include glass fibers, carbon fibers, metal fibers, etc. Such plant fibers and inorganic fibers are usually used in the form of long fibers that have been split.

Kenaf, which is used as a particularly preferable reinforcing fiber, is a fast growing annual grass having a woody stem and is a plant classified into malvaceae. The kenaf includes *hibiscus cannabinus* and *hibiscus sabdariffa* in scientific names, and further includes Indian hemp, Cuban kenaf, kenaf Tai kenaf, mesta, bimli hemp, ambary hemp, Bombay hemp, etc. in common names.

The ratio of the reinforcing fibers to the first thermoplastic resin is not particularly limited and can be suitably set in accordance with the type, the application, etc. of the resin molding 100. For example, when reinforcing fibers are plant fibers such as kenaf, the proportion of the plant fibers can be set to 30 to 60% by mass, and especially 40 to 50% by mass where the total amount of the plant fibers and the first thermoplastic resin is 100% by mass.

Moreover, also in the case of a resin molding 100 including one substrate 1 including reinforcing fibers and a first thermoplastic resin and the other substrate 2 constituted of an injection-molded member, wherein the density in the connection part of the one substrate 1 is higher than the density of a base part 11 excluding the connection part, the shape of the connection part is not particularly limited and may be trapezoidal (the connection part 32), rectangular (the connection part 31), or the like when viewed on a cross-section of the one substrate 1 and the other substrate 2, and it is preferably trapezoidal. In the case of a connection part 32 whose cross-sectional shape is trapezoidal, the pushing force applied by a resin injected is reduced gradually by gradually reducing the thickness from each of the one substrate 1 and the other substrate 2 toward the joined interface when the other substrate 2 is molded by injecting the resin against an end surface of the one substrate 1, and, as a result, resin leakage and generation of wrinkles are suppressed efficiently.

Moreover, the position of the interface of the one substrate 1 and the other substrate 2 on the transverse direction of the connection part 31 may be near the intermediate part or alternatively may be proximal to an end part, but it is usually near the intermediate part. Moreover, in the case of a connection part 32 whose cross-sectional shape is trapezoidal, the position of the interface is preferably near the edge part of an inclined surface of the other substrate 2 (the shaded portion of the other substrate 2 when viewed on a cross-section of the connection part 32) in order to reduce the influence of the pressure of a resin injected against an end surface of the one substrate 1. Thanks to this, since the resin injected is thinned and simultaneously joined to an end surface of the one substrate 1 increased in density by thinning, the leakage of the resin, the generation of wrinkles in the one substrate 1, etc. are suppressed more efficiently.

The one substrate 1 including reinforcing fibers and a first thermoplastic resin binding the reinforcing fibers to each other is molded as a plate-like body. And when the resin molding 100 is an interior material for vehicles, such as a door trim or a roof trim, an under shape structure made of a thermoplastic resin for attaching an interior material to a vehicle panel, such as a retainer bracket, a boss or a runner, is formed by injection-molding on a surface (rear surface) of the plate-like body (see the retainer bracket 4 in FIG. 8, which is a kind of under shape structure).

Figure 8:
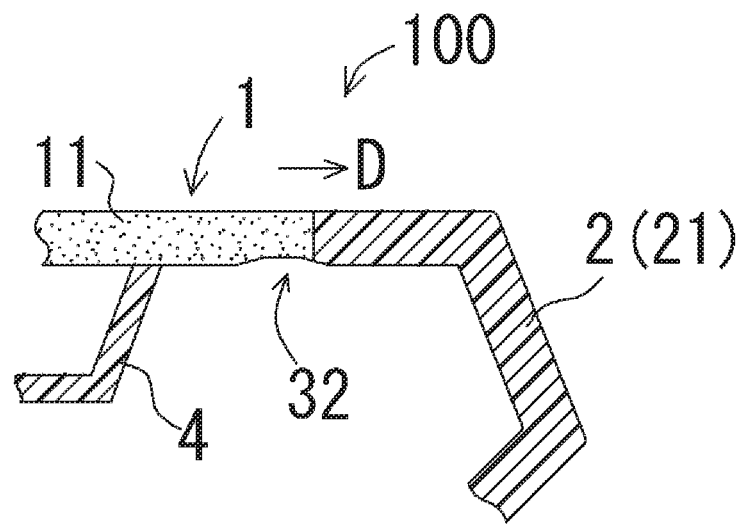
FIG. 8 is a schematic cross-sectional view of a resin molding that is an interior material for vehicles, in which a joined part constituted of a thin part with a trapezoidal cross-section having inclined surfaces on the sides of both substrates has been formed near the joined part of one substrate and the other substrate, and the joined interface is located at an intermediate part of the inclined surface of the other substrate.

In a resin molding 100 in which the one substrate 1 is a plate-like substrate including reinforcing fibers and a first thermoplastic resin binding the reinforcing fibers to each other, and the other substrate 2 is an injection-molded member connected along the plate face direction of the one substrate 1, the other substrate 2 is extended along the plate face direction D of the one substrate 1 near the interface of the one substrate 1 and the other substrate 2 (see FIG. 8). In this case, in the vicinity of the joined interface of the connection part 31, 32, the second thermoplastic resin injected may slightly enter the one substrate 1 or reinforcing fibers may enter the other substrate 2 depending on the injection pressure, which, however, does not cause any particular problems.

Although the other substrate 2 is extended from the one substrate 1 having a plate-like shape along the plate face direction D thereof at least near the joined interface in the connection part 31, 32, the other substrate 2 may also be configured to have a plate-like part further extended as a part of the injection-molded member. Although the plate-like part may have been formed in any shape, the plate-like part may be an aesthetic under shape part 21 (see the aesthetic under shape part 21 in FIG. 8) when the resin molding 100 is an interior material for vehicles or the like.

Figure 6:
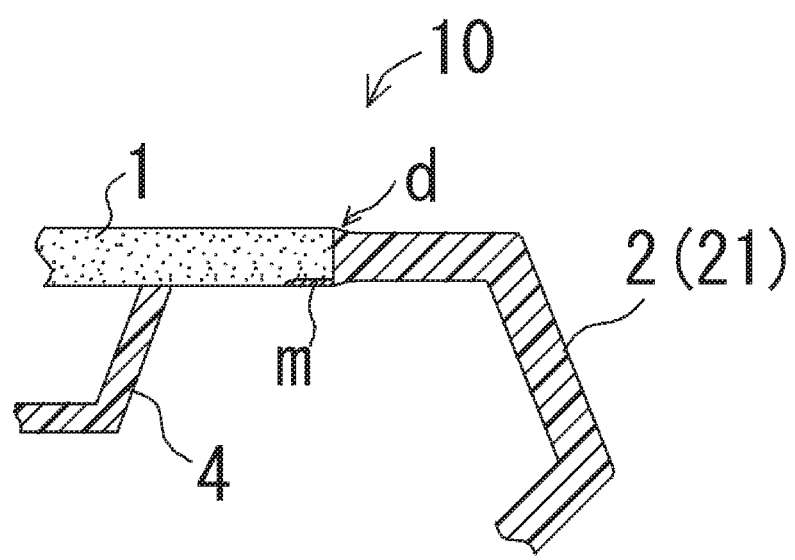
FIG. 6 is a schematic cross-sectional view of a resin molding that is an interior material for vehicles, in which a difference in level and resin leakage have occurred near the joined part of one substrate and the other substrate.
Figure 7:
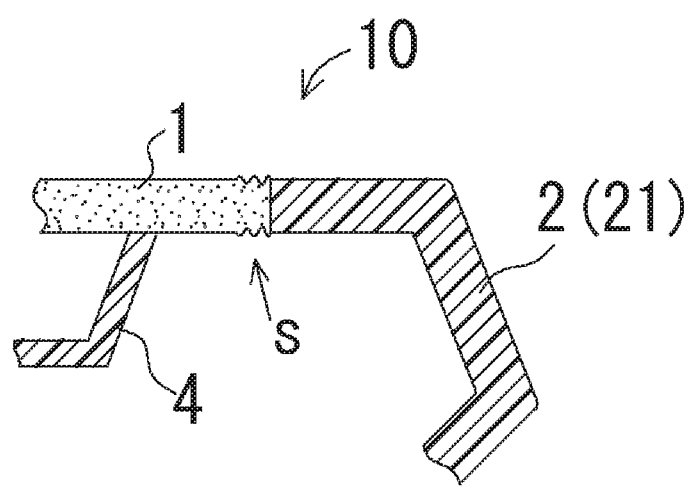
FIG. 7 is a schematic cross-sectional view of a resin molding that is an interior material for vehicles, in which the end surfaces (joined interface) have been shifted to the side of one substrate due to the injection pressure of the resin of the other substrate and wrinkles have been formed on the one substrate.

Also in the case of a resin molding 10 having a retainer bracket 4, which a kind of under shape structure, and an aesthetic under shape part 21, a difference in level d or a resin leakage m may occur (see FIG. 6) and wrinkles may be generated near an joined interface of the one substrate 1 (see FIG. 7) when no connection part 31, 32 is provided.

Moreover, when the resin molding 100 is an interior material for vehicles or the like and the aesthetic under shape part 21 has been formed, the resin molding 100 may have a rib that is arranged on the side of another surface that will not be an aesthetic surface from the one substrate 1 to the plate-like part and that stands almost perpendicularly to the plate face direction of the one substrate 1. The rib can be formed as a part of an injection-molded member when injecting a second thermoplastic resin to be used for the formation of a plate-like part that is allowed to serve as the other substrate 2 and the aesthetic under shape part 21. By forming a rib in such a manner, an outer edge part of the resin molding 100 can be strengthened and a prescribed aesthetic surface shape can be maintained when the resin molding 100 is an interior material for vehicles or the like, and an interior material which is not distorted easily upon coming into contact with other articles, etc. can be made.

The one substrate 1 is formed using the first thermoplastic resin. The injection-molded member to constitute the other substrate 2 is formed using the second thermoplastic resin. Although the first thermoplastic resin and the second thermoplastic resin may be the same type of resin or alternatively may be different types of resin, it is preferred that they be the same type of resin in order to sufficiently and easily join an end surface of the one substrate 1 with an end surface of the other substrate 2 constituted of the injection-molded member. The same type of resin referred to herein means that the main monomers to constitute the respective resins (polymers) are the same, and it may be a resin made of a homopolymer composed of the monomer or alternatively may be a resin made of a copolymer in which a prescribed amount of other monomers is copolymerized.

The first and second thermoplastic resins are not particularly limited and examples thereof include polyolefin resins, such as polypropylene and polyethylene, acrylic resins, such as polymethyl acrylate and polymethyl methacrylate, polyamide resins, such as Nylon-6 and Nylon-66, and polyester resins, such as polyethylene terephthalate and polybutylene terephthalate. Of the various types of resins, the polyolefin resins, especially, polypropylene resins, such as polypropylene homopolymers, are preferred. These thermoplastic resins are each blended with and caused to contain a prescribed amount of additive usually used for such types of resins, such as antioxidants, UV absorbers, lubricants, and antistatic agents, as necessary, thereby forming a thermoplastic resin composition, and then this resin composition is used for molding.

The resin molding 100 of the present invention can be used in a wide variety of product fields, such as vehicle-related fields and building-related fields. In the vehicle-related field, it is suitable as interior materials, exterior materials, structural materials, etc. of vehicles. For example, it is used as a door trim, a pillar garnish, a seat back board, a roof trim, an instrument panel, a console box, a dashboard, and a deck trim. In addition, it can also be used for various types of transfer means or transport means such as railroad vehicles, ships, and airplanes. Moreover, in the building-related field, it is suitable as interior materials, exterior materials and structural materials of various types of buildings. For example, it is used as a door mounting material, a door structural material, a mounting material or a structural material of various types of furniture (e.g., desk, chair, shelf, or chest of drawers), etc.

[2] Method for Producing Resin Moldings

A method for producing a resin molding of the present invention includes a shaping step of shaping one substrate 1, and an injection-molded member molding step of injecting a thermoplastic resin composition against an end surface of the one substrate 1 shaped, thereby connecting the other substrate 2. In the injection-molded member molding step, there is arranged a mold for forming a connection part at a region that is to become a connection part 31, 32.

The shaping step is a step of shaping one substrate 1 into a plate-like molding having a prescribed planar shape. The injection-molded member molding step is a step of injecting a resin composition against an end surface of the one substrate 1 shaped (an end surface of the connection part 31, 32), thereby extending the other substrate 2 from the end surface along the plate face direction D of the one substrate 1. In this step, by arranging a mold having a protruding part for forming the connection part 31, 32 at a region that is to become the connection part 31, 32, it is possible to form a recessed part having a shape corresponding to the protruding part of the mold, that is, a connection part 31, 32 having a reduced thickness.

The method of molding the one substrate 1 is not particularly limited, but the substrate is usually molded by press-molding. Since the one substrate 1 is provided with the other substrate 2 by injecting a resin composition against its end surface (a joined interface in the connection part 31, 32), the molding of the resin molding 100 is performed by insert-molding. As the preliminary molding that will become the one substrate 1 to be inserted to a mold, there can be used a web formed by mixing reinforcing fibers such as plant fibers with the first thermoplastic resin. In the formation of the web, the first thermoplastic resin is mixed in the form of fiber, powder, or the like, and mixing in the form of fiber is preferred because this makes the web formation easier.

The one substrate 1 can be molded by heating a preliminary molding, such as a web, formed as described above to a prescribed temperature according to the melting point of the first thermoplastic resin, etc., then inserting it into a mold having a cavity with a prescribed shape, and subsequently pressurizing it to shape. Moreover, the one substrate 1 and the other substrate 2 can be molded at the same time by injecting a resin composition including a second thermoplastic resin simultaneously with the pressurization to the preliminary molding such that the resin composition flows toward a surface that will become an end surface of the one substrate 1 (a joined interface in the connection part 31, 32), and then cooling. When the preliminary molding is heated and pressurized, the interlacing points of the reinforcing fibers are bound with the molten first thermoplastic resin, and thus one substrate 1 reinforced by fibers can be yielded.

Figure 9:
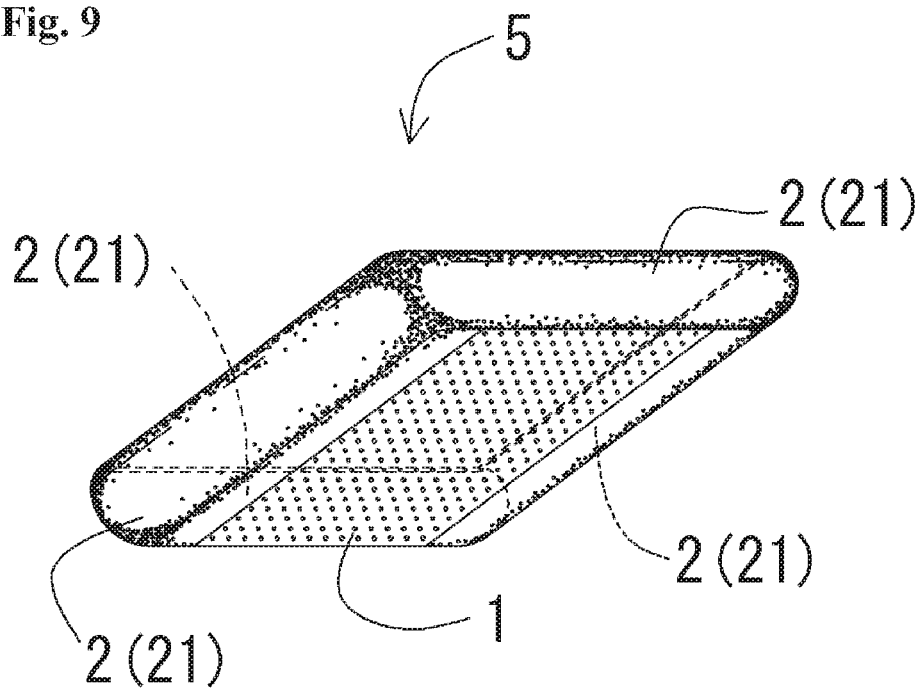
FIG. 9 is a schematic perspective view of one example of the resin molding of the present invention.
Figure 10:
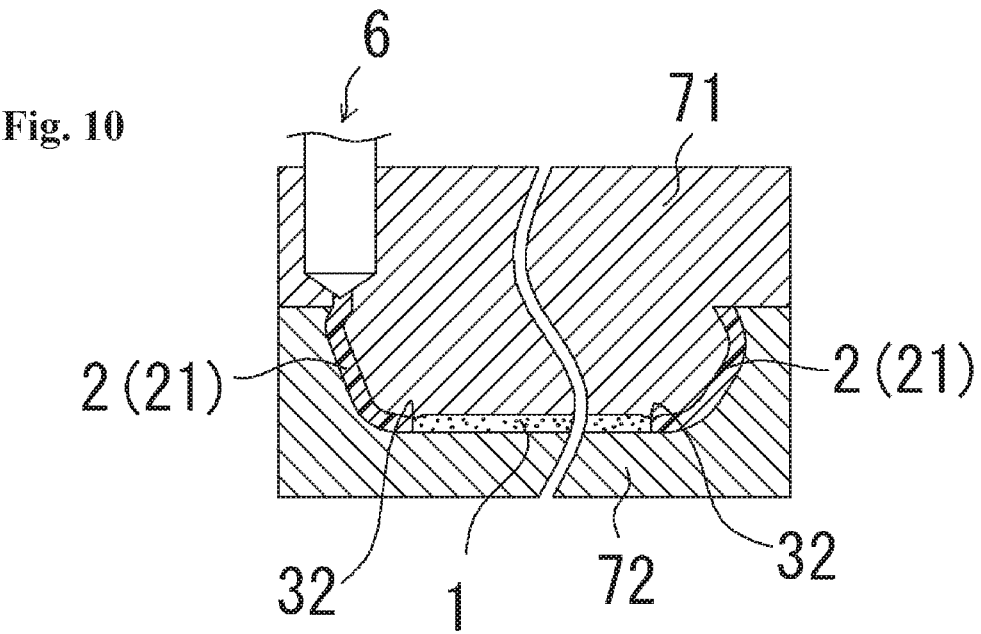
FIG. 10 is a schematic cross-sectional view illustrating the production of the resin molding of the present invention.

Moreover, when the resin molding 100 is an interior material for vehicles, or the like, by using a prescribed mold when injecting the resin composition including the second thermoplastic resin such that the resin composition flows toward a surface that will become an end surface of the one substrate 1 (a joined interface in the connection part 31, 32) and thereby molding the other substrate 2, it is possible to simultaneously mold a plate-like part further extending from a part extending along the plate face direction of the one substrate 1, thereby forming the aforementioned aesthetic under shape part 21 (see FIG. 8) [see FIG. 10 illustrating an embodiment in which a resin molding is molded using a mold composed of a stationary mold (core mold) 71 equipped with an injection-molding machine 6 and a mobile mold (cavity mold) 72, and FIG. 9 illustrating a resin molding 5 obtained by releasing from the mold after thus molding] and it is also possible to form a rib at the same time.

It is noted that the foregoing examples have been provided merely for the purpose of explanation and are in no way to be construed as limiting of the present invention. While the present invention has been described with reference to exemplary embodiments, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The resin molding of the present invention and a method for producing the same can be used in a wide variety of product fields such as vehicle-related fields and building-related fields. Especially, they are useful in the technical field of interior materials for vehicles, such as door trims and roof trims.

What is claimed is:

1. A resin molding in which two types of substrates are connected to each other on the end surfaces thereof,
   wherein the resin molding has a connection part constituted of a thin part provided from the one substrate to the other substrate with a boundary defined by the end surfaces,
   wherein the density of the one substrate in the connection part is higher than the density of a base part, the base part being a region of the one substrate excluding the connection part,
   wherein the one substrate is a plate-like substrate comprising reinforcing fibers and a first thermoplastic resin binding the reinforcing fibers to each other,
   wherein the other substrate is an injection-molded member connected along the plate face direction of the one substrate from an end surface of the one substrate, and
   wherein the reinforcing fibers are plant fibers.

2. The resin molding according to claim 1, wherein the connection part has, on the side thereof closer to the other substrate, a section gradually thinned from a position at which the connection part extends.

3. The resin molding according to claim 1, wherein the connection part has, on the side thereof closer to the other substrate, a section gradually thinned from a position at which the connection part extends, and
   the end surfaces are located at an edge part of the part that is gradually thinned.

4. The resin molding according to claim 1, wherein the connection part has, on the side thereof closer to the one substrate, a section gradually thinned from a position at which the connection part extends.

5. The resin molding according to claim 1, wherein the connection part has, on the side thereof closer to the other substrate, a section gradually thinned from a position at which the connection part extends, and
   wherein the connection part has, on the side thereof closer to the one substrate, a section gradually thinned from a position at which the connection part extends.

6. The resin molding according to claim 1, wherein the connection part has, on the side thereof closer to the other substrate, a section gradually thinned from a position at which the connection part extends,
   the end surfaces are located at an intermediate part of the part that is gradually thinned, and
   wherein the connection part has, on the side thereof closer to the one substrate, a section gradually thinned from a position at which the connection part extends.

7. The resin molding according to claim 1, wherein
   the connection part has, on the side thereof closer to the other substrate, a section gradually thinned from a position at which the connection part extends,
   the end surfaces are located at an edge part of the part that is gradually thinned, and
   wherein the connection part has, on the side thereof closer to the one substrate, a section gradually thinned from a position at which the connection part extends.

8. The resin molding according to claim 1, wherein the first thermoplastic resin and a second thermoplastic resin contained in the other substrate are the same type of thermoplastic resin.

9. A method for producing a resin molding according to claim 1, comprising:
   a shaping step of shaping the one substrate, and
   an injection-molded member molding step of injecting a thermoplastic resin composition against the end surface of the one substrate shaped, thereby connecting the other substrate, wherein
   in the injection-molded member molding step, there is arranged a mold for forming the connection part at a region that is to become the connection part.

\* \* \* \* \*